United States Patent [19]

Chang

[11] 4,273,306

[45] Jun. 16, 1981

[54] ADJUSTABLE-HEIGHT SUPPORT APPARATUS

[76] Inventor: Pek S. Chang, Flat No. 509, Lai Kit Lau, 38, Lai Tak Tsuen, Tai Hang, Hong Kong

[21] Appl. No.: 39,863

[22] Filed: May 17, 1979

[30] Foreign Application Priority Data

Jun. 10, 1978 [GB] United Kingdom ............... 26658/78

[51] Int. Cl.[3] ............................................ F16M 13/00

[52] U.S. Cl. .................................... 248/421; 108/145; 182/141

[58] Field of Search ................. 248/57, 421, 422, 406; 108/147, 145; 5/63; 280/42.23; 182/141

[56] References Cited

U.S. PATENT DOCUMENTS

| | | | |
|---|---|---|---|
| 722,166 | 3/1903 | Taft | 108/147 X |
| 1,725,216 | 8/1929 | Seldomridge | 108/147 X |
| 1,794,165 | 2/1931 | Gannaway | 108/147 X |
| 2,091,088 | 8/1937 | Whedon et al. | 248/421 X |
| 2,206,788 | 7/1940 | Meacham | 108/147 X |
| 3,259,369 | 7/1966 | Gridley | 182/141 X |
| 3,317,931 | 5/1967 | Benoit et al. | 5/63 X |
| 3,447,635 | 6/1969 | Carlbom | 182/141 |
| 3,796,282 | 3/1974 | Denier | 108/145 X |
| 3,964,725 | 6/1976 | Matsui | 248/421 |
| 4,029,283 | 6/1977 | Swenson | 248/421 X |

FOREIGN PATENT DOCUMENTS

| | | | |
|---|---|---|---|
| 259392 | 1/1949 | Switzerland | 108/145 |
| 15730 | of 1895 | United Kingdom | 108/145 |
| 1030115 | 5/1966 | United Kingdom | 108/147 |

*Primary Examiner*—J. Franklin Foss
*Attorney, Agent, or Firm*—Jones, Thomas & Askew

[57] ABSTRACT

An adjustable-height support apparatus such as an adjustable-height table or bed, including a platform which is supported by a pair of leg supports, which cross each other, each leg support comprising a pair of legs pivotally connected at one end with respect to the platform for sliding movement, the opposite end being arranged to contact a support surface; a strut being associated with each leg, the associated strut being pivotally connected at one end to the platform and the other end being pivotally connected at a location along the leg, both legs of each pair being connected together for movement in unison, and actuating means, e.g. a ram or a screw member associated with both leg supports for slidably moving the legs relative to the platform to lower or higher the platform.

9 Claims, 13 Drawing Figures

ADJUSTABLE-HEIGHT SUPPORT APPARATUS

The present invention relates to adjustable-height support apparatus.

It is known to provide tables with adjustable legs but these known constructions suffer certain drawbacks. For instance, one known construction utilises adjustable legs wherein each leg is arranged so that its effective length can only be adjusted to predetermined selected positions. Such constructions do not enable each leg to be variably adjusted to any desired length.

Additionally, a drawback with tables having adjustable legs is that each leg is individually operated in order to carry its length. This can make it awkward for an operative to adjust the height of the table.

According to the present invention there is provided adjustable-height support apparatus comprising a pair of leg supports, each leg support comprising a pair of spaced and interconnected legs and at least one strut pivotally connected to the legs intermediate their ends, elongate means in which one end of each leg is pivotally engaged, the positions of said ends of the legs of the two leg supports being relatively adjustably positionable along said elongate means, the ends of the struts remote from the legs being pivotally mounted at fixed points relative to the elongate means, the legs of one leg support crossing the legs of the other leg support, actuating means for moving the legs along the elongate means, and support means on the elongate means or on the opposite ends of the legs.

The apparatus may be constructed as a table but may serve to support a bed or tent, or may be in the form of a trolley.

Reference is now made to the accompanying drawings, in which.

Figure 1A:
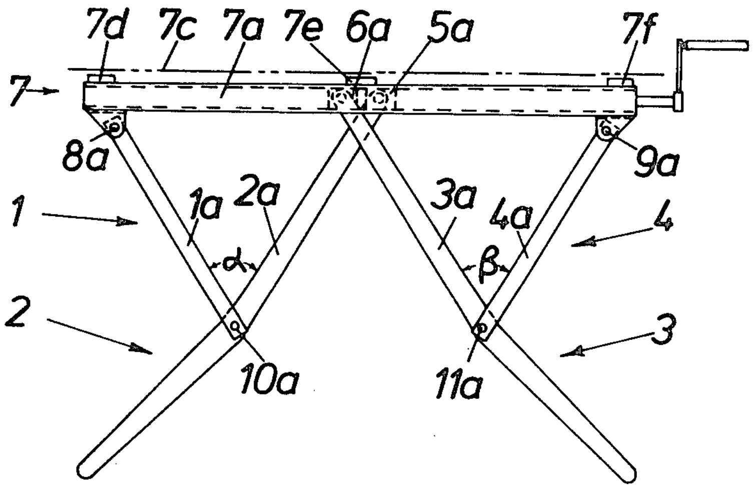
FIG. 1A is a front view of a first embodiment, according to the present invention.
Figure 1B:
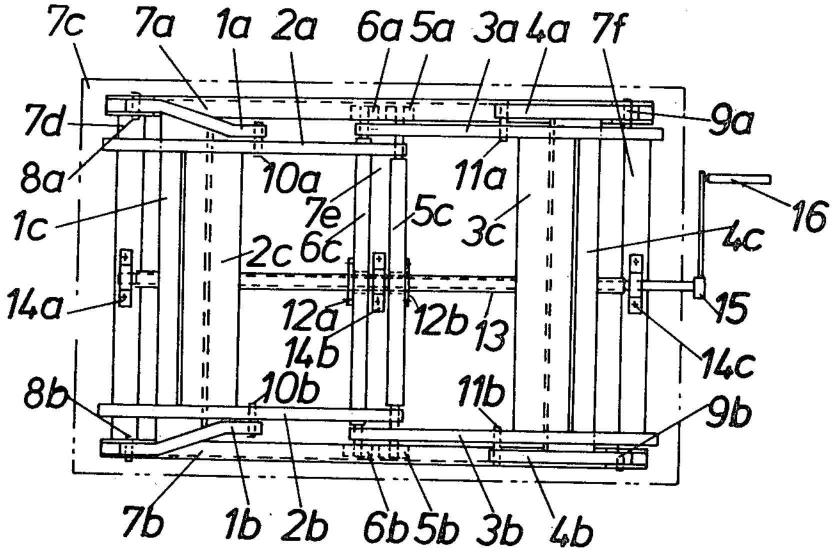
FIG. 1B is a bottom view of the embodiment shown in FIG. 1A.
Figure 1C:
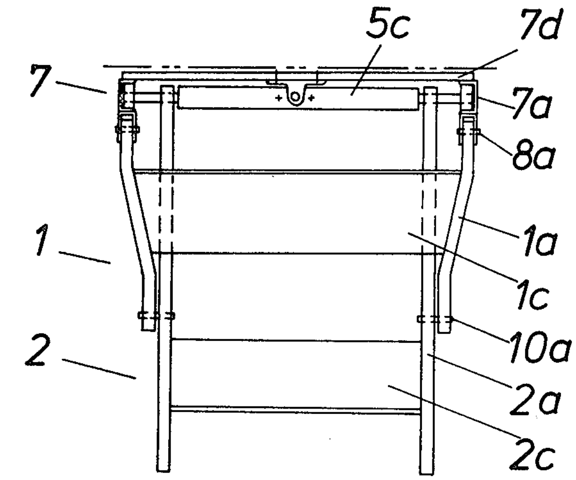
FIG. 1C is a side view of the embodiment shown in FIG. 1A as viewed from the left.
Figure 1D:
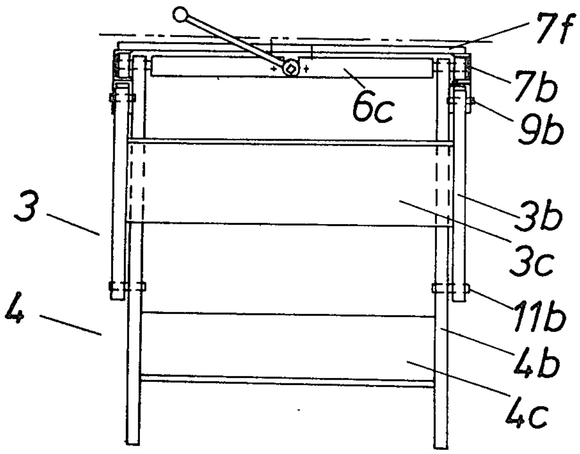
FIG. 1D is a side view of the embodiment shown in FIG. 1A as viewed from the right.
Figure 1E:
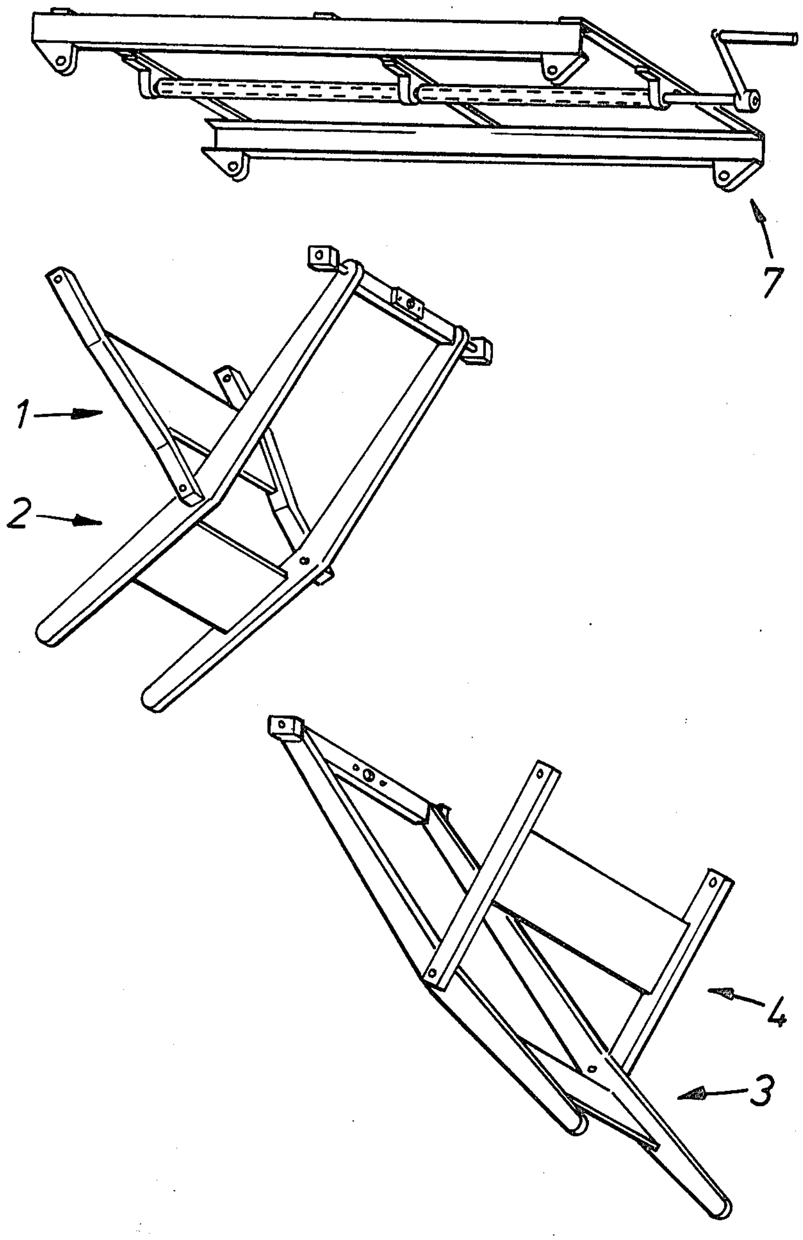
FIG. 1E is an exploded perspective view of the embodiment shown in FIG. 1A.
Figure 2A:
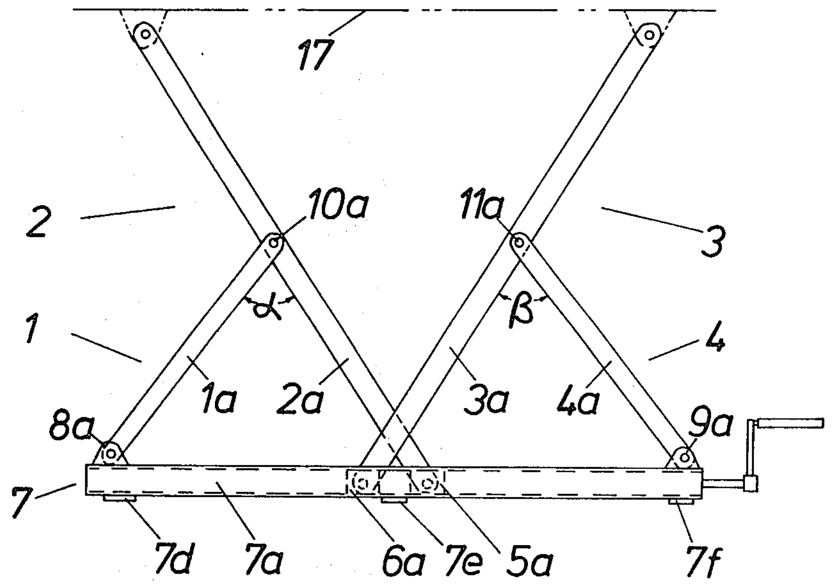
FIGS. 2A, 2B, 2C and 2D are the front, top, left-side and right side views respectively of a modification of the first embodiment.
Figure 2B:
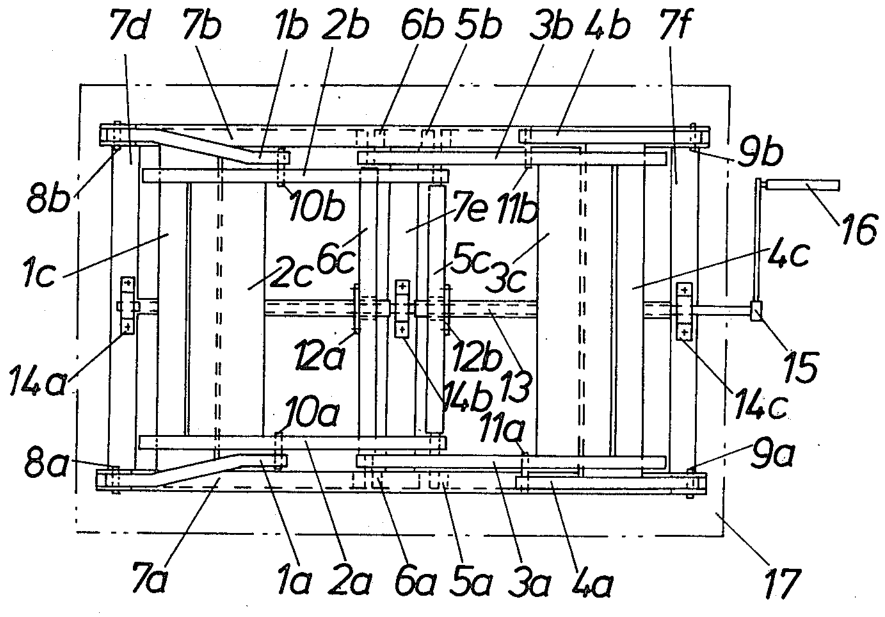
Figure 2C:
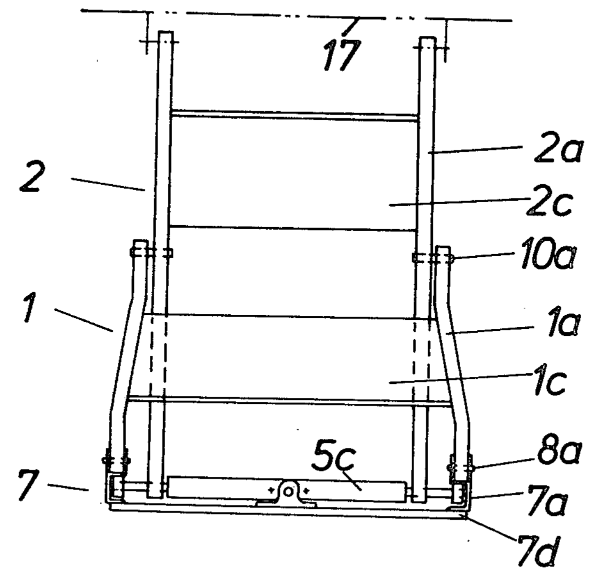
Figure 2D:
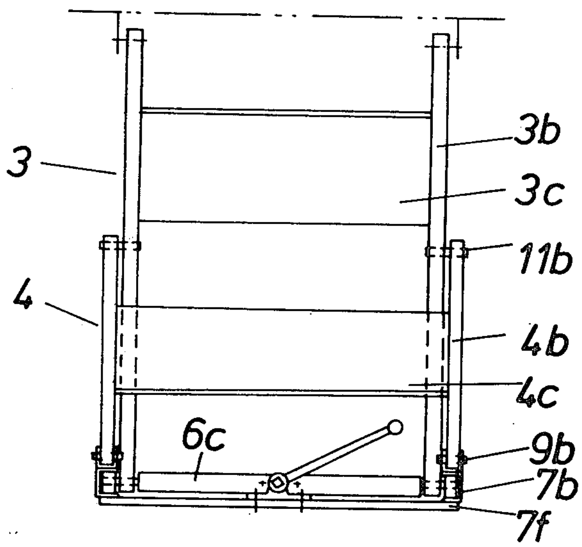
Figure 3A:
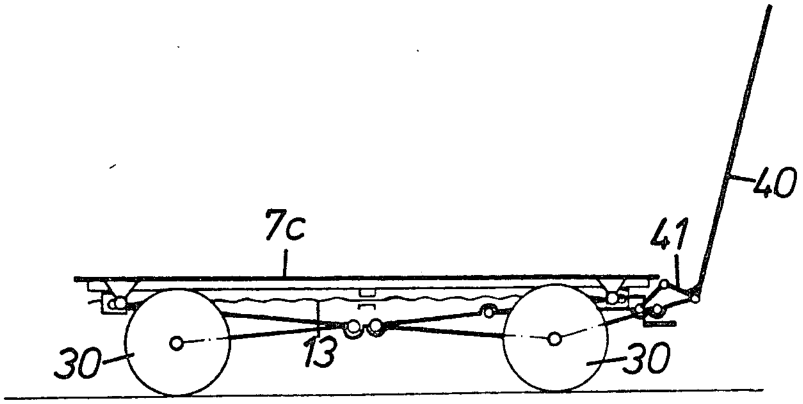
Figure 3B:
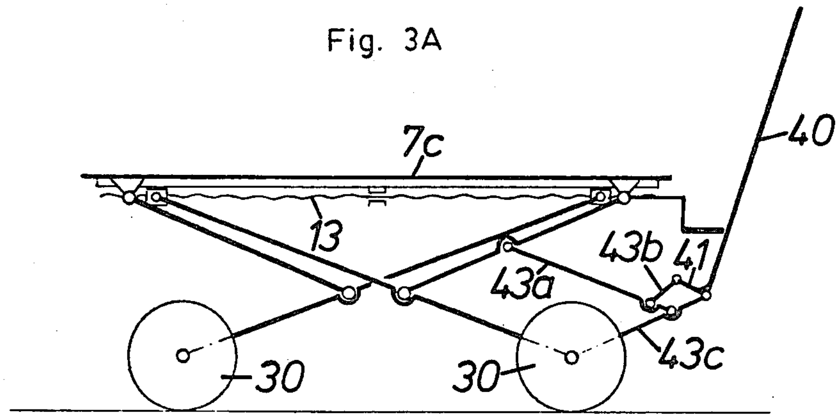
Figure 3C:
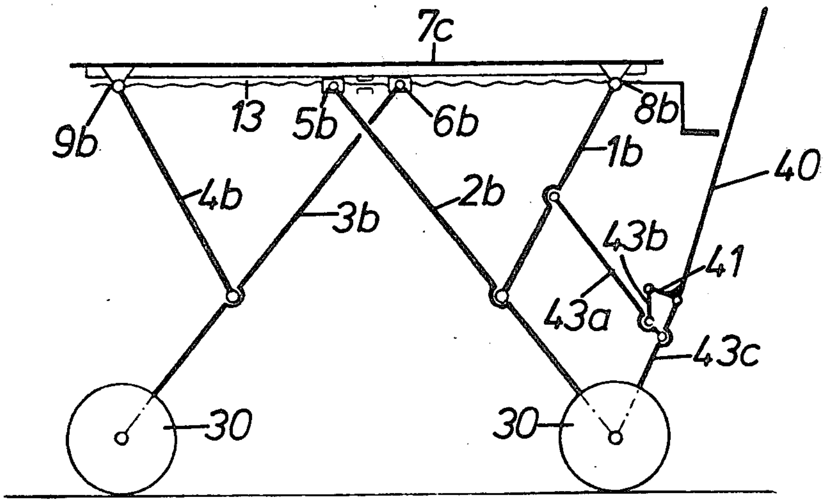
Figure 4:
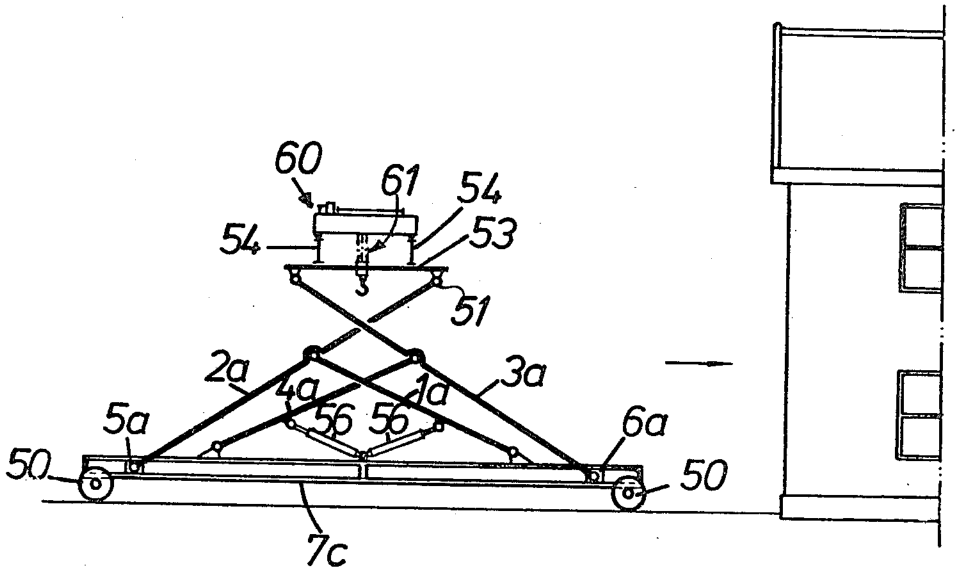

FIGS. 3A, 3B and 3C schematically show a second embodiment in low, half-lifted and fully-lifted positions respectively; and FIG. 4 schematically shows a third embodiment operated by an oil pump.

Referring initially to FIGS. 1A to 1E there is shown a first embodiment according to the present invention which includes two leg supports 1, 4 respectively. In FIGS. 1A to 1E the leg supports 1, 4 are connected to and depend from a frame comprising parallel longitudinal members 7*a*, 7*b* and cross pieces 7*d*, 7*e* and 7*f*. A platform 7*c* may be mounted on the cross members e.g. to define a tabletop.

Leg support 1 includes a pair of legs 2*a* and 2*b* which are connected at one end to one another by a cross-member 5*c*: the opposite, terminal, end of each leg 2*a*, 2*b* being arranged to contact a support surface (not shown) on which the embodiment is intended to stand. The leg support 1 also includes a pair of struts 1*a* and 1*b* respectively which are associated with respective legs 2*a*, 2*b*. Strut 1*a* is pivotally connected at one end to a seat 8*a* attached to the platform 7*c* and is pivotally connected at its opposite end to leg 2*a* by a pivot pin 10*a*; the latter pivotal connection being located about midway along the length of leg 2*a*.

Similarly, strut 1*b* is pivotally connected at one end to a seat 8*b* attached to the platform 7*c* and is pivotally connected at its opposite end to leg 2*b* by a pivot pin 10*b*.

Similarly, leg support 4 has a pair of legs 3*a* and 3*b* connected at one end to one another by a cross-member 6*c*. A pair of struts 4*a* and 4*b* are provided, one end of each strut being pivotally connected to respective seats 9*a* and 9*b* and their opposite ends being pivotally connected to respective legs 3*a* and 3*b* by pivot pins 11*a* and 11*b* respectively.

Both cross-members 5*c* and 6*c* carry at their terminal ends sliding members 5*a*, 5*b* and 6*a*, 6*b*, respectively. These sliding members may be in the form of sliding blocks or rollers e.g. mounted on the cross-members by bearings. The longitudinal members 7*a*, 7*b* are of channel form to define guideways and sliding members 5*a* and 6*a* are slidingly received in longitudinal member 7*a* and sliding members 5*b* and 6*b* are slidingly received in longitudinal member 7*b*.

A screw member in the form of an externally threaded rod 13 is rotatably attached to the cross pieces 7*d*, 7*e*, 7*f* by means of support brackets 14*a*, 14*b* and 14*c*. The rod 13 has a first threaded portion extending from midway along the rod to the end of the rod adjacent the bracket 14*a* and has a second threaded portion extending from midway along the rod to the opposite end of the rod. A nut 12*a* is threadedly received on the first threaded portion and is fixedly secured to cross-member 6*c*. A nut 12*b* is threadedly received on the second threaded portion and is fixedly secured to the cross-member 5*c*. The first and second thread portions are of opposite sense so that on rotation of the rod 13 the cross-members 5*c*, 6*c* are caused to move in opposite directions simultaneously. Accordingly, the terminal ends of the legs are caused to move simultaneously either away from or toward the platform 7*c*. Rod 13 is provided with a handle 16 connected to crank 15 in order to enable the rod to be manually rotated.

In FIGS. 2A to 2D a modification is illustrated in which similar parts to those in FIG. 1 have been designated by similar reference numbers. The modification is turned upside side relative to FIGS. 1A to 1E and the cross pieces 7*d*, 7*e*, 7*f* are laid on a support surface. The terminal end of each leg is pivotally connected to a seat which is attached to a platform 17. By operation of handle 16, the platform 17 may be raised and lowered above the support surface to a desired height.

It is envisaged that a series of holes may be provided in both longitudinal members 7*a* and 7*b* for the reception of locking pegs. Thus the sliding members may be releasably locked in position in their associated longitudinal members so as to rigidly lock the legs in position.

In FIGS. 3A to 3B a second embodiment is schematically illustrated in which parts similar to those in FIG. 1 have been denoted by similar reference numerals.

In the second embodiment, ground engaging wheels 30 are provided which are rotatably carried by the legs. In order to enable the apparatus to be conveniently pushed a handle 40 is provided having a lateral projection 41 at one end. The handle 40 is pivotally connected to a series of interconnected linkages 43*a*, 43*b* and 43*c* which are arranged as schematically shown to enable the handle 40 to maintain substantially the same inclination irrespective of the height of the platform *7c*.

In FIG. 4, a third embodiment is illustrated in which parts similar to those in FIG. 1 have been denoted by the same reference numerals. In the third embodiment ground engaging wheels 50 are provided for supporting the platform *7c* above the ground. The terminal ends of each leg is pivotally attached to a seat 51 which is secured to a support member 53. The support member 53 supports one end of a pair of girders 54 (their other end being supported by the support member of an apparatus similar to the fourth embodiment).

A carriage 60 having a winch and hook arrangement 61 is movably mounted on the girders 54.

In order to raise and lower the support member 53 a hydraulic ram 56 is connected between each strut and the platform *7c*.

I claim:

1. Adjustable-height support apparatus comprising a pair of leg supports, each leg support comprising a pair of spaced and interconnected legs and at least one strut pivotally connected to the legs intermediate their ends, elongate means in which one end of each leg is pivotally engaged, the positions of said one ends of the legs of the two leg supports being relatively adjustably positionable along said elongate means, the ends of the struts remote from the legs being pivotally mounted at fixed points relative to the elongate means, the legs of one leg support crossing the legs of the other leg support, actuating means operatively associated with said legs for moving the legs along the elongate means, and support means on the elongate means or on the opposite ends of the legs.

2. Apparatus according to claim 1, wherein the elongate means is a guide means along which the legs are slidable.

3. Apparatus according to claim 2 wherein a cross-member is extended laterally between each pair of legs, the cross-member being slidably received at each end in a pair of parallel guideways associated with said elongate means.

4. Apparatus according to claim 3 wherein the cross-member is connected to rollers which are engaged in the guideways.

5. Apparatus according to claim 3 or 4 wherein the actuating means is a screw member rotatably mounted with respect to the guideways, each cross-member mounting a nut threadedly received on the screw-member, the screw member having two thread portions of opposite hand, the nut of one of the cross-members being received on a first of said portions and the nut of the other cross-member being received on the second of said thread portions so that rotation of the screw member causes said cross-members to move simultaneously in opposite directions.

6. Apparatus according to claim 1 wherein the actuating means comprises hydraulic or pneumatic rams secured to the guide means and arranged to act upon the struts.

7. Apparatus according to any preceding claim wherein the ends of said legs remote from the guide means are provided with ground engaging wheels.

8. Apparatus according to claim 1, wherein the legs of one leg support are unconnected with the legs of the other legs support at said crossing.

9. Apparatus according to claim 1, wherein:

said elongate means comprises guide means along which said one end of each leg is slidable; and said legs of one leg support cross said legs of the other leg support between said one ends and said opposite ends of the legs, so that the one ends of the legs are slidably moved away from each other along said guide means to reduce the height between said opposite ends and said elongate means, and vice versa.

* * * * *